US012626363B2

(12) United States Patent
Sousa Ferreira et al.

(10) Patent No.: US 12,626,363 B2
(45) Date of Patent: May 12, 2026

(54) AUTOMATIC DETECTION AND DIFFERENTIATION OF BILIARY LESIONS IN CHOLANGIOSCOPY IMAGES

(71) Applicant: DIGESTAID—ARTIFICIAL INTELLIGENCE DEVELOPMENT, LDA, Gondomar (PT)

(72) Inventors: João Pedro Sousa Ferreira, Oporto (PT); Miguel José Da Quinta E Costa De Mascarenhas Saraiva, Oporto (PT); Filipe Manuel Vilas Boas Silva, Oporto (PT); Manuel Guilherme Gonçalves De Macedo, Oporto (PT); João Pedro Lima Afonso, Mazedo (PT); Marco Paulo Lages Parente, Oporto (PT); Renato Manuel Natal Jorge, Oporto (PT); Tiago Filipe Carneiro Ribeiro, Lordelo (PT); Pedro Nuno Valente Reis Pereira, Oporto (PT)

(73) Assignee: Digestaid—Artificial Intelligence Development, LDA, Gondomar (PT)

( * ) Notice: Subject to any disclaimer, the term of this patent is extended or adjusted under 35 U.S.C. 154(b) by 331 days.

(21) Appl. No.: 18/547,671

(22) PCT Filed: Feb. 23, 2022

(86) PCT No.: PCT/PT2022/050008
§ 371 (c)(1),
(2) Date: Aug. 23, 2023

(87) PCT Pub. No.: WO2022/182263
PCT Pub. Date: Sep. 1, 2022

(65) Prior Publication Data
US 2024/0135540 A1    Apr. 25, 2024
US 2024/0233122 A9    Jul. 11, 2024

(30) Foreign Application Priority Data

Feb. 25, 2021    (PT) .......................................... 117086

(51) Int. Cl.
*G06T 7/00* (2017.01)

(52) U.S. Cl.
CPC .. *G06T 7/0012* (2013.01); *G06T 2207/10068* (2013.01); *G06T 2207/20081* (2013.01);
(Continued)

(58) Field of Classification Search
CPC ......... G06T 7/0012; G06T 2207/10068; G06T 2207/20081; G06T 2207/20084;
(Continued)

(56) References Cited

U.S. PATENT DOCUMENTS 6,671,540 B1 * 12/2003 Hochman .......... A61B 5/14553
600/431
11,024,031 B1 * 6/2021 Nozaki ................ A61B 1/2736
(Continued)

OTHER PUBLICATIONS

Patent Cooperation Treaty, International Search Report issued in PCT/PT2022/050008, Jun. 3, 2022, pp. 1-3.
(Continued)

*Primary Examiner* — Van D Huynh
(74) *Attorney, Agent, or Firm* — Heister & Associates

(57) ABSTRACT

The present invention relates to a computer-implemented method capable of automatically classifying and differentiating biliary lesions in images obtained from a digital cholangioscopy system, characterizing them according to their malignant potential, through the classification of pixels as a malignant lesion, or benign lesion, followed by a characterization stage and indexing of such lesions according to a set of morphologic characteristics with clinical relevance, namely the presence/absence of tumor vessels,
(Continued)

the presence/absence of papillary projections, the presence/absence of intraductal nodules and the presence/absence of tumor masses.

11 Claims, 22 Drawing Sheets

(52) U.S. Cl.
CPC .............. *G06T 2207/20084* (2013.01); *G06T 2207/30096* (2013.01)

(58) Field of Classification Search
CPC . G06T 2207/30096; G06T 2207/30092; G06T 7/62

See application file for complete search history.

(56) References Cited

U.S. PATENT DOCUMENTS

| | | | | |
|---|---|---|---|---|
| 11,468,273 | B2 * | 10/2022 | Zhu .................. | G06F 18/24133 |
| 2006/0120608 | A1 * | 6/2006 | Luo ...................... | G06T 7/0012 |
| | | | | 382/224 |
| 2011/0052028 | A1 * | 3/2011 | Shreiber .................. | G06T 7/11 |
| | | | | 382/128 |
| 2016/0051220 | A1 * | 2/2016 | Lee .......................... | G06T 7/149 |
| | | | | 600/453 |
| 2018/0068083 | A1 * | 3/2018 | Cohen .................... | G16H 50/20 |
| 2019/0033315 | A1 * | 1/2019 | Bathe .................. | G01N 33/507 |
| 2022/0020496 | A1 * | 1/2022 | Saito .................... | G06T 7/0012 |
| 2022/0172355 | A1 * | 6/2022 | Patel .................... | G06V 20/695 |
| 2023/0274421 | A1 * | 8/2023 | Cho ........................ | G16H 50/20 |
| | | | | 382/131 |
| 2024/0127433 | A1 * | 4/2024 | Du ......................... | G16H 50/20 |

OTHER PUBLICATIONS

Valerio et al., "Lesions Multiclass Classification in Endoscopic Capsule Frames", Procedia Computer Science, Jan. 1, 2019, pp. 637-645, vol. 164.

Budd et al., "A Survey on Active Learning and Human-in-the-Loop Deep Learning for Medical Image Analysis", arxiv.org, Cornell University Library, Ithaca, NY, Oct. 7, 2019, pp. 1-16.

Yan et al., "Intelligent diagnosis of gastric intestinal metaplasia based on convolutional neural network and limited No. of endoscopic images", Computers in Biology and Medicine, Oct. 12, 2020, pp. 1-8, vol. 126.

* cited by examiner

| Evaluation of method 9000 | Best overall accuracy (mean ± standard deviation in %) | |
| --- | --- | --- |
| | with method 8000 (our method) | without method 8000 |
| VGG | 85.3 ± 5.2 | 81,2 |
| ResNet50 | 89.1 ± 3.9 | 82,6 |
| ResNet125 | 93.1 ± 6.4 | 85,2 |
| InceptionV3 | 92.8 ± 3.9 | 87,3 |
| MobileNet | 75.4 ± 2.7 | 68,7 |
| Xception | 96.2 ± 3.4 | 90,2 |
| EfficientNetB3 | 88.3 ± 3.7 | 82,4 |
| EfficientNetB5 | 95.2 ± 3.5 | 87,3 |
| EfficientNetB7 | 98.4 ± 2.1 | 91,5 |

FIG.10

AUTOMATIC DETECTION AND DIFFERENTIATION OF BILIARY LESIONS IN CHOLANGIOSCOPY IMAGES

RELATED PATENT APPLICATIONS

This patent application is the National Phase of International Application No. PCT/PT2022/050008, filed Feb. 23, 2022, which designated the U.S. and that International Application was published under PCT Article 21(2) in English, which claims the benefit of priority to Portuguese Patent Application No. 117086, filed Feb. 25, 2021. The entire contents of the foregoing applications are incorporated herein by reference, including all text, tables and drawings.

BACKGROUND OF THE INVENTION

The present invention relates to a computer-implemented method capable of automatically characterizing biliary lesions in digital cholangioscopy images, comprising the detection of lesions in medical images by the classification of pixels as a malignant lesion or benign lesion, followed by an architecture of morphologic characterization and indexing according to morphologic characteristics clinically relevant.

The digital cholangioscopy is a diagnostic tool essential for detecting biliary lesions, namely biliary strictures. By carefully examining the cholangioscopy images, clinicians can detect, identify, and characterize biliary lesions of neoplastic or inflammatory etiology. The examination of strictures and malignancy is performed by biopsy and/or real-time cholangioscopic assessment. This method is prone to human error and has high interobserver variability.

Additionally, in cholangioscopy, the video images are readily available and digitally stored for posterior review and comparison. Within this context, image data creates a strong and fertile ground for computer-aided diagnosis using machine learning systems for biliary lesions characterization, namely the indeterminate biliary strictures and, consequently, the decision making. The goal of detecting biliary lesions is to yield a more accurate, thoroughly automated characterization of the biliary lesions and, therefore, assess the malignancy and aid in the medical diagnosis and treatment.

Valerio, Maria Teresa, et al. in "Lesions Multiclass Classification in Endoscopic Capsule Frames." Procedia Computer Science 164(2019): 637-645 drew attention to the time-consuming and error-prone identification of the digestive tract lesions by medical experts. In addition, the authors proposed an automated approach to identify these lesions, based on deep learning networks, in wireless capsule endoscopy images, with medical notes.

US 2020286219 A1 presents a method for detecting similar images and classifying images from video capsule endoscopy. The invention does not apply optimized training sessions for image classification. The method of the invention does not detect, classify or characterize biliary lesions from digital cholangioscopy images.

US 2018296281 A1 presents a control system for capsule endoscopy based on image feature recognition by machine learning. The system controls the capsule orientation by calculating the center of mass of the detected image feature. The invention does not apply methods for classifying images into images of digital cholangioscopy.

WO 2020256568 A1 protects the use of image classifiers in endoscopy videos (in any endoscopy video). On the contrary, the present invention aims to protect the method for image classifier development. Additionally, our technology allows the detection and evaluation of malignancy status in the biliary lesions of cholangioscopy, as opposed to the aforementioned document that focuses on the detection of lesions in the gastrointestinal tract, in which the proven and specific applicability in biliary lesions was not evidenced, which do not belong to the digestive tube. Indeed, the technology developed by our group allows the detection and characterization of lesions that are not found in the gastrointestinal tract, but in the bile ducts.

The diseases of the bile ducts are currently pathologies with a relevant epidemiological impact and, often, when not removed, they can evolve into cancer. The characterization of biliary strictures is a challenge. ERCP (Endoscopic Retrograde Cholangiopancreatography) has a suboptimal sensitivity for diagnosing biliary malignancy. The introduction of cholangioscopy enables the direct visualization of the bile ducts and the visual characterization of the morphologic features associated with malignancy, optimizing the diagnostic yield of ERCP. For this reason, cholangioscopy has considerably increased the sensitivity in detecting malignant biliary strictures and allows biopsies to be performed under direct visualization.

In cholangioscopy, the endoscopic elements are provided with a portable image recording device and means to convert these captures to a digitized representation and be stored in a personal computer.

Cholangioscopy images, due to the nature of their acquisition, often lack light or other photographic conditions that allow the classification of the bile ducts directly performed. Within this context, a Deep Learning method was developed to automatically perform this task, presenting excellent diagnostic performance metrics (over overall accuracy of 95%), with high sensitivity, specificity, positive predictive value, and negative predictive value, allowing its potential use in clinical practice.

BRIEF SUMMARY OF THE INVENTION

The present invention provides a Deep Learning method for characterizing the malignancy status of the biliary strictures in the cholangioscopy images. Furthermore, the invention allows the identification of intraductal nodules, tumor vessels, papillary projections, and tumor masses, allowing further morphologic characterization of biliary strictures. The automatic identification of the malignancy status of strictures is vital to determine the diagnosis of bile duct neoplasia's/cholangiocarcinoma, which is crucial for diagnosis and treatment planning.

By training the images of the ImageNet[1] dataset in different architectures and further testing them, using Cholangioscopy image sets, the potential to classify biliary lesions is shown. The clinical nature of the present invention is justified by the artificial intelligence system's ability to detect, classify and characterize biliary lesions, particularly indeterminate biliary strictures, allowing the evaluation of the malignant status of the biliary strictures and the identification of morphologic characteristics of malignancy with clinical relevance in the characterization of the biliary strictures.

This new approach based on five sequential convolutional neural networks (binary network for attesting the malignancy status; binary network for identifying tumor vessels; binary network for identifying papillary projections; binary network for identifying intraductal nodules; binary network for identifying tumor masses), allows the automatic classification and characterization of biliary lesions. Correctly evaluating the malignancy status of biliary strictures and its morphologic characterization is essential in clinical practice, allowing a complete diagnosis in digital cholangioscopy. Furthermore, the specific application of an artificial intelligence system for cholangioscopy is a relevant novelty introduced by this invention in the current state of the art. Indeed, one of the most critical and frequent indications for performing digital cholangioscopy is the existence of indeterminate biliary strictures. Therefore, by classifying the malignancy status of biliary strictures and by identifying morphologic characteristics of malignancy, whether they are tumor masses, intraductal nodules, tumor vessels, and papillary projections, the present invention helps the clinical staff to define better the diagnostic and therapeutic management of the patient, which can reflect optimized clinical outcomes.

The following was considered relevant to highlight the problem solved by the present invention from the methods known in the art to classify the malignancy status of bile ducts lesions, namely of indeterminate biliary strictures, as well as the identification of morphologic characteristics of biliary lesions with clinical relevance, more specifically tumor vessels, papillary projections, nodules, and tumor masses, in the digital cholangioscopy.

In one embodiment of the method (i.e., in a cholangioscopy exam), biliary lesions are detected in digital cholangioscopy images. The identification of digital cholangioscopy images is vital to assess the malignant/neoplastic nature of the bile ducts. Furthermore, the present invention uses transfer learning and semi-active learning. Transfer learning allows features extraction and high-accuracy classification using robust dataset sizes.

The semi-active implementation allows a continuous improvement in the classification system. Furthermore, the invention uses, preferably, transfer learning for features extraction in digital cholangioscopy images, or the semi-active learning strategy for digital cholangioscopy images.

Another embodiment of the method splits the dataset into a series of stratified data groups (k-fold). The images related to a given patient are included in one fold only.

Furthermore, additionally or alternatively, such data are trained and validated with the patients grouping into a random fold, i.e., the images of an arbitrary patient belong to either the training set or the validation set.

A method that uses the chosen training and validation sets to train a series of network architectures, including features extraction and a classification component, is preferred. The series of convolutional neural networks to train include, but is not limited to: VGG16, InceptionV3, Xception Efficient-NetB5, EfficientNetB7, Resnet50 and Resnet125. Preferably, their weights are frozen, except for the BatchNormalization layers, and are coupled with a classification component. The classification component comprises at least two dense layers, preferably of sizes 2048 and 1024, and, at least, one dropout layer of preferably 0.1 between them.

Alternatively, but not preferably, the classification component can be used with more dense layers or with dense layers of different sizes. Alternatively, but not preferably, the classification component can also be used without dropout layers.

Further, additionally and preferably, the best performing architecture is chosen according to the overall accuracy and sensitivity. Performance metrics include but are not limited to f1-metrics. Further, the method is not limited to two to four dense layers, in sequence, starting with 4096 and decreasing in half up to 512. Between the final two layers, there is a dropout layer with a drop rate of 0.1.

Lastly, the best performing solution is trained using the entire dataset with the patient grouping.

Other embodiments of the present invention may include similar classification networks, training weights, and hyper-parameters.

These may include using any image classification network, new or not designed.

In general, the method includes two modules: prediction and output collector. The prediction reads the videos and identifies the images with findings. On the other hand, the output collector passes these images with findings for processing.

Examples of advantageous effects of the present invention include: training using parameters from machine learning results of increasing everyday datasets, cloud-based; automatic prediction of the cholangioscopy image by using a deep learning method, so that the biliary lesions, from image input, of digital cholangioscopy, can be identified and classified into five categories (benign vs. malignant; absence of non-intraductal nodules vs. intraductal nodules; non-tumor vessels vs tumor vessels; no mass vs mass; non-papillary/villous vs papillary/villous projections using a dataset. The use of transfer learning improves the image classification speed and the corresponding classification accuracy.

BRIEF DESCRIPTION OF THE DRAWINGS

FIG. 10 illustrates a result of performing deep learning-based lesion classification on the data volume 240 and 250, according to an embodiment of the present invention.

DETAILED DESCRIPTION

Figure 1:
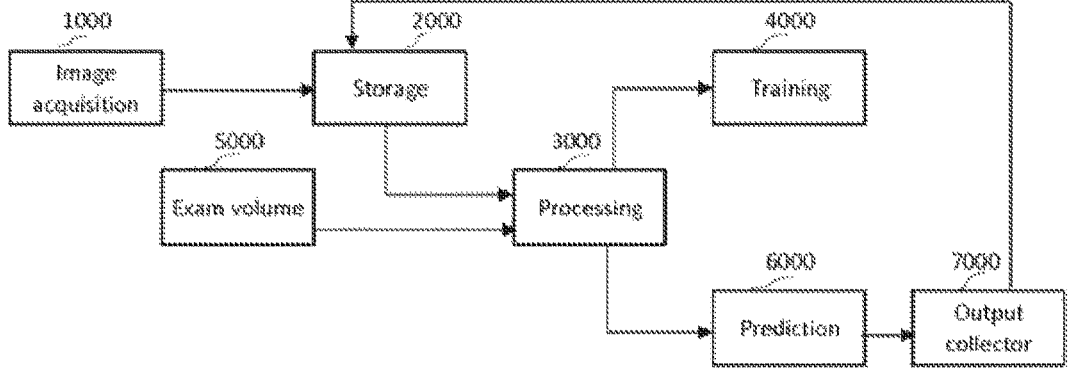
FIG. 1 illustrates a method for detecting biliary lesions, according to an embodiment of the present invention.

The present invention discloses a new method and system capable of detecting the malignant status and morphologically classifying biliary lesions, in images acquired during a digital cholangioscopy exam.

Some preferable embodiments will be described in more detail with reference to the accompanying drawings, in which the embodiments of the present disclosure have been illustrated. However, the present disclosure can be implemented in various manners, and thus, should not be construed to be limited to the embodiments disclosed herein.

It is to be understood that although this disclosure includes a detailed description about cloud computing, the implementation of the teachings recited herein is not limited to a cloud computing environment. Rather, the embodiments of the present invention are capable of being implemented in conjunction with any other type of computing environment now known or later developed.

The term "deep learning" is a machine learning technique that uses multiple data processing layers to classify the data sets with high accuracy. It can be a training network (model or device) that learns based on a plurality of inputs and outputs. A deep learning network can be a deployed network (model or device), generated from the training network and provides an output response to an input.

The term "supervised learning" is a deep learning training method in which the machine is provided with data already classified from human sources. In supervised learning, features are learned via a labeled input.

The term "Convolutional Neural Networks" or "CNNs" are networks that interconnect data used in deep learning to recognize objects and regions in datasets. CNNs evaluate raw data in a series of stages to assess the learned features.

The term "transfer learning" is a machine storing the information learned when attempting to solve one problem to solve another problem of nature similar to the first.

The term "semi-active learning" is used as a process of machine learning. Before executing the next learning process, the training network appends a set of labeled data to the training dataset from a trusted external entity. For example, as a machine collects more samples from specialized staff steps, the less prone is to mispredict images of identical characteristics.

The term "computer-aided diagnosis" refers to machines that analyze medical images to suggest a possible diagnosis.

The term "biliary lesions" relates to any lesion that affects the bile ducts (for example, malignant or benign biliary strictures, biliary calcules, inflamatory lesions).

The term "indeterminate biliary strictures" relates to biliary strictures without a clear etiology, after the image (for example ultrasonography, computed tomography or magnetic resonance) and conventional endoscopic approach (via endoscopic ultrasonography or endoscopic retrograde cholangiopancreatography), with tissue sampling (biopsies).

The term "tumor ducts" relates to dilated/tortuous vessels, in a pattern described as spider-like vascularization. This morphologic parameter represents the process of formation of new blood vessels associated with neovascularization, a vital process in the progression of the neoplasia. It is the most common cholangioscopic finding associated with the malignant biliary neoplasia.

The term "papillary projections" relates to digitiform projections within the lumen of the biliary duct, with variable length. These cholangioscopic findings are associated with the neoplasia of biliary ducts.

The terms "intraductal nodules" and "tumor masses" refer to protruding lesions associated with malignancy within the lumen of the biliary duct. The intraductal nodules were differentiated from tumor masses according to the diameter of the biliary duct occupied by the lesion: the identification of a biliary lesion as a nodule was applied if the bulging biliary lesion would occupy less than a quarter of the duct diameter, while the lesions were classified as tumor masses if they occupied at least a quarter of the biliary duct lumen.

The present invention relates to a deep learning-based method for attesting the malignancy status of the biliary lesions, as well as the detection and morphologic characterization of cholangioscopic findings with clinical relevance (tumor vessels, tumor masses) in the cholangioscopy images (FIG. 1). Often, the embodiments of the present invention provide a visual understanding of the biliary lesions detection method, by deep learning. The automatic classification of the lesions of biliary ducts images, in digital cholangioscopy, is a challenging task, since lesions with different bleeding potential have similar shape and contrast.

A method is described for the classification of biliary ducts lesions, in the digital cholangioscopy, according to an embodiment of the present invention. The method comprises an image acquisition module, a storage module, a training input module, a processing module, an exam input module, a training module, a prediction module, and an output collector module.

Figure 4:
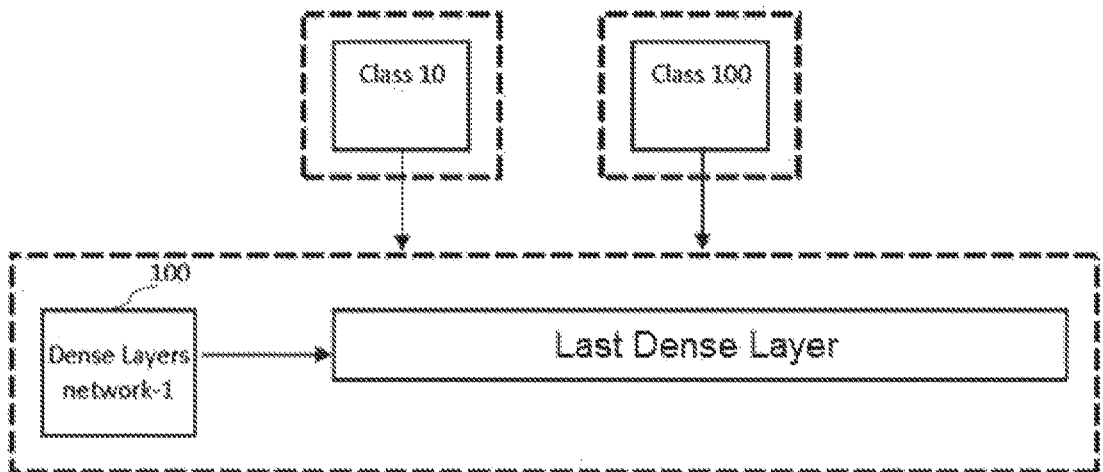
FIG. 4 illustrates the structure of the classification network to distinguish biliary lesions.

The image acquisition module 1000 receives exam input volumes from digital cholangioscopy providers. The images and the corresponding labels are loaded onto the storage module 2000. The storage module 2000 includes a variety of classification network architectures 100, trained convolutional network architectures 110 and hyperparameters for the training. The storage module 2000 can be a local or cloud server. The storage module contains training input labelled data from the digital cholangioscopy images and the metadata necessary to run the processing module 3000, the training module 4000, the prediction module 5000, a second prediction module 6000, and an output collector module 7000. The input labelled data include, but not only, images and the corresponding lesion classification. The metadata include, but not only, a variety of architectures of classification networks 100, exemplified in FIG. 4, a variety of architectures of trained convolutional neural networks 110, training hyperparameters, training metrics, fully trained models, and fully trained selected models.

The images 1000 and the labelled data are processed at the processing module 3000, before running the optimized training at the training module 4000. The processing module normalizes the images according to the deep model architecture, to be trained at 3000 or evaluated at 4000. By manual or scheduled request, the processing module normalizes the image data at the storage module 2000, according to the deep model architectures that will run at training module 4000. Additionally, the processing module generates the data pointers to the storage module 2000, to form the partial or full images and ground-truth labels required to run the training module 3000. To prepare each training session, a dataset is divided in folds, where patient-specific imagery is exclusive to one and one fold only, for training and testing. The training set is split for model training, to generate the data pointers of the all images and ground-truth labels, required to run the training process 9000. The k-fold is applied with the stratified grouping by patient in the training set, to generate the data pointers of the partial images and ground-truth labels, required to run the model verification process 8000 of the training module 4000. The split ratios and the number of folds are available at the metadata of the storage module. Operators include, but are not limited to users, a convolutional neural network trained to optimize the k-fold or a mere computational routine. Merely as an example, the dataset is divided with the patient split into 90% for the training and 10% for the testing. Optionally, the images selected for training can be split into 80% for training and 20% for validation during training. A 5-fold stratified grouping by patient is applied in the images selected for training. By manual or scheduled request, the processing module normalizes the exam volume data 5000, according to the deep model architecture to run at the prediction module 6000.

Figure 2:
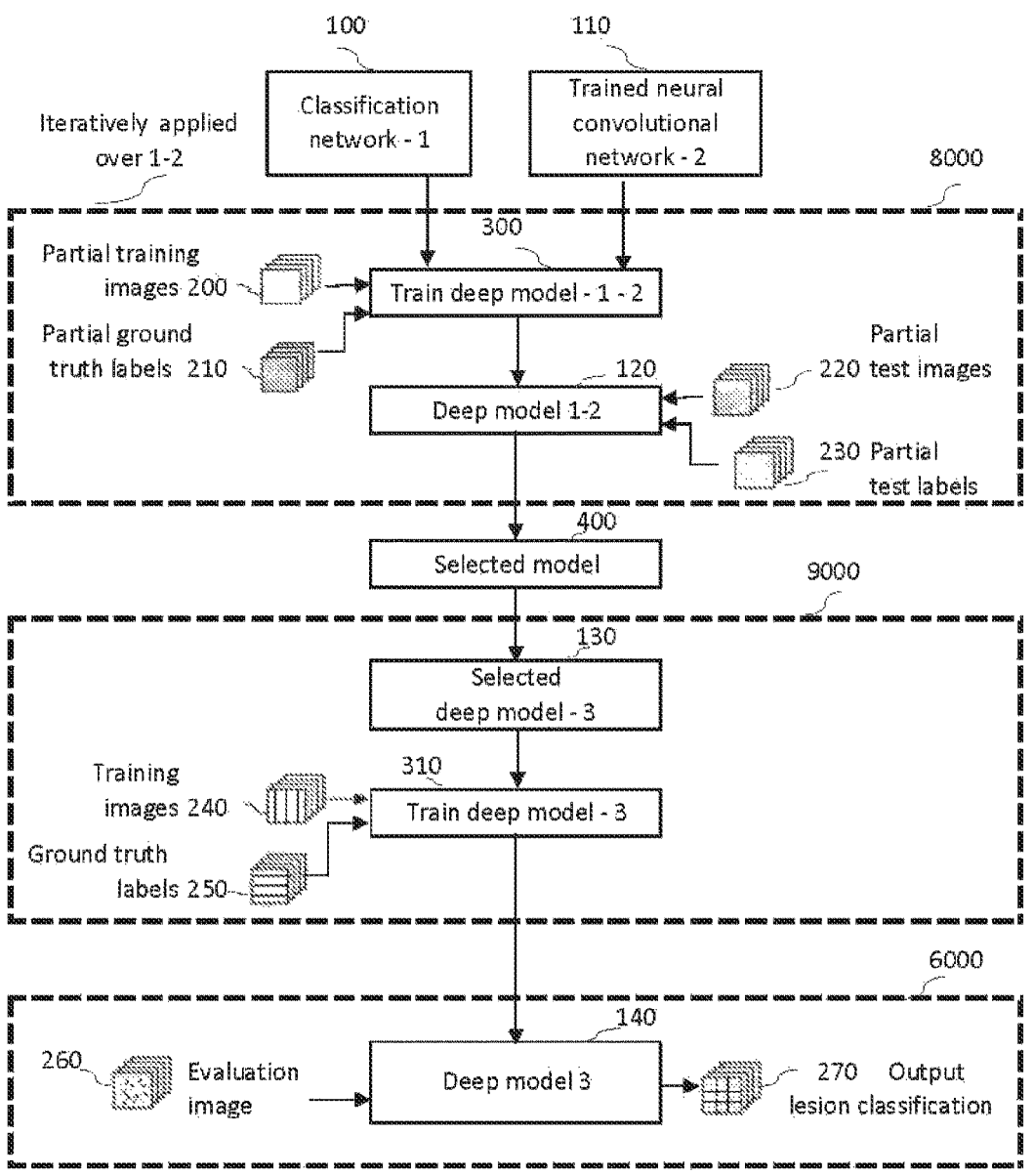
FIG. 2 illustrates the automatic detection and differentiation of the biliary erosions in the cholangioscopy exam.
Figure 3:
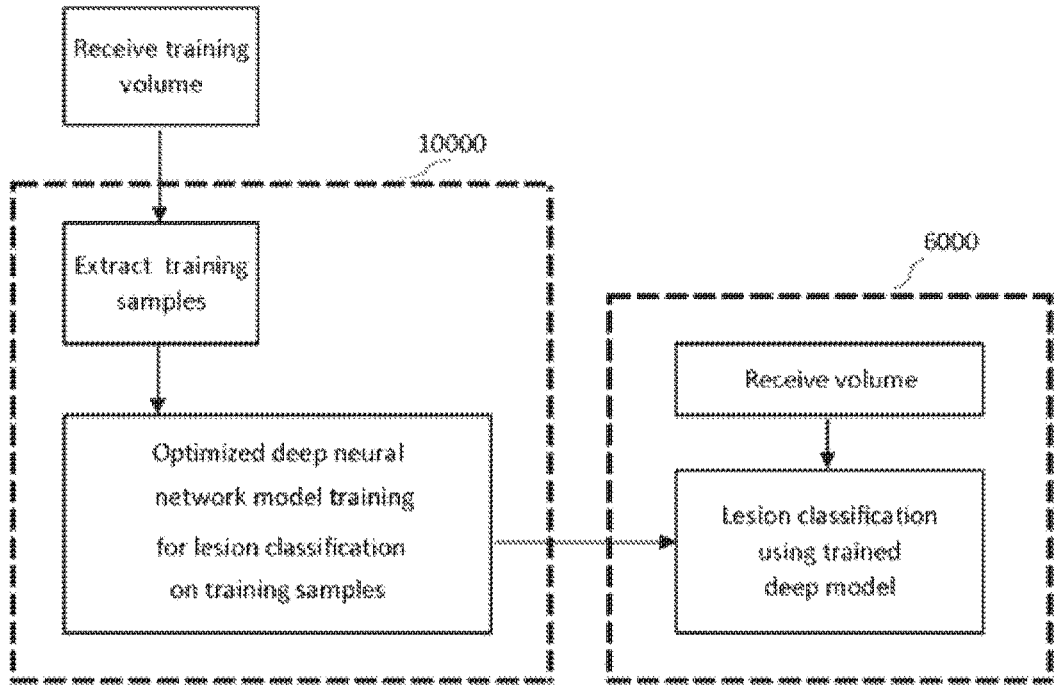
FIG. 3 illustrates the major processes for automatic detection and differentiation of biliary lesions in the cholangioscopy exam.

As seen in FIG. 2, the training module 4000 has a model verification process 8000, a model selection step 400 and a model training step 9000. The model verification part iteratively selects combinations of classification architectures 100 and convolutional networks 110 to train a deep model for the classification the biliary ducts. The classification network 100 has Dense and Dropout layers to classify the bile ducts lesions according to their malignant potential. A neural convolutional network 110, trained on large datasets is coupled to the said classification network 100 to train a deep model 300. Partial training images 200 and ground-truth labels 210 train the said deep model 300. The performance metrics of the trained deep model 120 are calculated using a plurality of partial training images 220 and ground-truth labels 230. The model selection step 400 is based on the calculated performance metrics, such as f-1. The model training part 9000 trains the selected deep model architecture 130, in the process 310, using the entire data of training images 240 and ground-truth labels 250. At the prediction module 6000, the trained deep model 140 produces the bile ducts lesion classification 270, from a given evaluation image 260. A volume of data exam 5000, comprising the video images from the digital cholangioscopy is the input of the prediction module 6000. The prediction module 6000 classifies the image volumes of the exam volume 5000, using the best-performed trained deep model from 4000 (see FIG. 3). An output collector module 7000 receives the classified volumes and load them into the storage module after validation by another neural network or any other computational system, adapted to perform the validation task.

Merely as an example, the invention comprises a server containing training results for architectures in which training results from cloud-based large datasets such as, but not only, ImageNet, ILSVRC, and JFT. The architecture variants include, but are not limited to, VGG, ResNet, Inception, Xception or Mobile, EfficientNets. All data and metadata can be stored in a cloud-based solution or on a local computer. The embodiments of the present invention also provide various approaches to make a faster deep model selection. FIG. 2 illustrates a method for classification of the biliary ducts lesions by deep learning, according to an embodiment of the present invention. The method of FIG. 2 includes a pre-training stage 8000, a training stage 9000. The training stage 8000 is performed with the early stopping on small subsets of data, to select the best-performed deep neural network for classification of the biliary ducts lesions, among multiple combinations of convolution and classification parts. For example, a classification network of two dense layers of size 512 is coupled with the Xception model to train on a random set resulting from k-fold cross validation with the patient grouping. Another random set is selected as the test set.

The training process 8000 with early stopping and testing on random subsets is repeated in an optimization loop for combinations of (i) classification and transfer-learned deep neural networks; (ii) training hyperparameters. The image feature extraction component of the deep neural network is any architecture variant without the top layers accessible from the storage module. The layers of the feature extraction component remain frozen, but are accessible at the time of training, via the mentioned storage module. The BatchNormalization layers of the feature extraction component are unfrozen, so that the system efficiently trains with digital cholangioscopy images, presenting distinct features from the cloud images. The classification component has, at least, two blocks, each having, among others, a Dense layer followed by a Dropout layer. The final block of the classification component has a BatchNormalization layer, followed by a Dense layer with the depth size equal to the number of lesions of the type one wants to classify.

The suitability of the optimization procedure is computed to (i) to guarantee a minimum accuracy and sensitivity at all classes, defined by a threshold; (ii) minimize the differences between training, validation, and test losses; (iii) maximize learning on the last convolutional layer. For example, if a training shows evidence of overfitting, a combination of a less deep model is selected for evaluation.

The training stage 9000 is applied on the best performed deep neural network using the entire dataset.

The fully trained deep model 140 can be deployed in the prediction module 6000. Each evaluation image 260 is then classified to produce a lesion classification 270. The output collector module has means of communication with other systems to perform the validation by the expert and the confirmation on data volumes newly predicted, reaching 270. Such communication means include a display module for the user input, a thoroughly trained neural network for decision making or any computational process programmable to execute such task. The validated classifications are loaded on the storage module to become part of the datasets needed to run the pipelines 8000 and 9000, either by manual or scheduled requests.

Figure 5A:
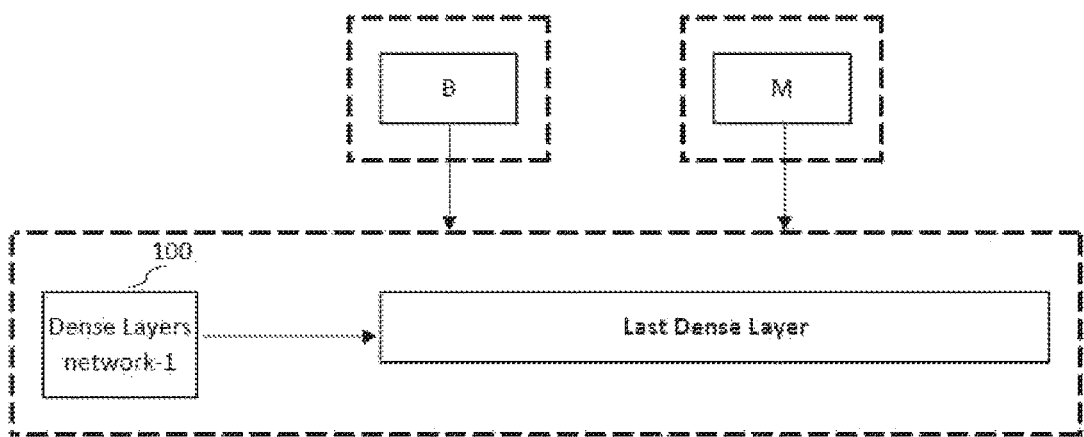
FIG. 5 depicts exemplary embodiments of the classification network of the biliary lesions.
Figure 5B:
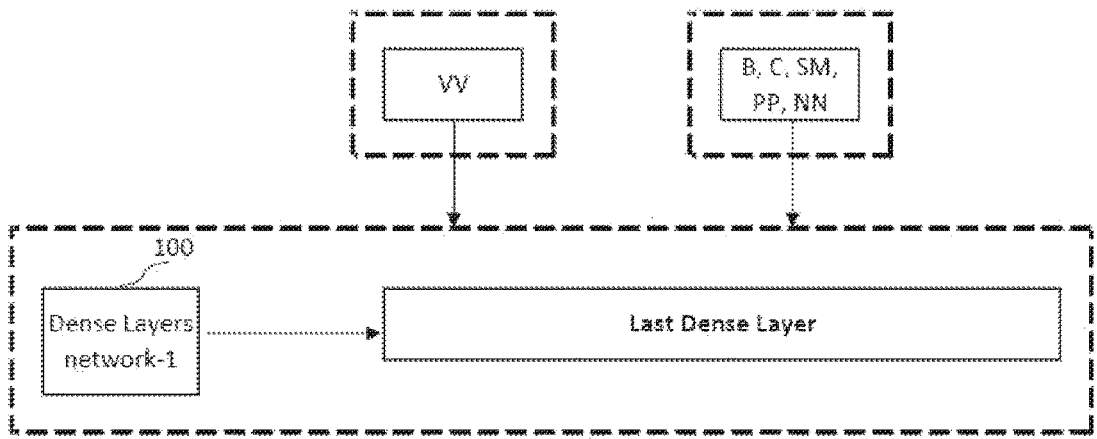
Figure 5C:
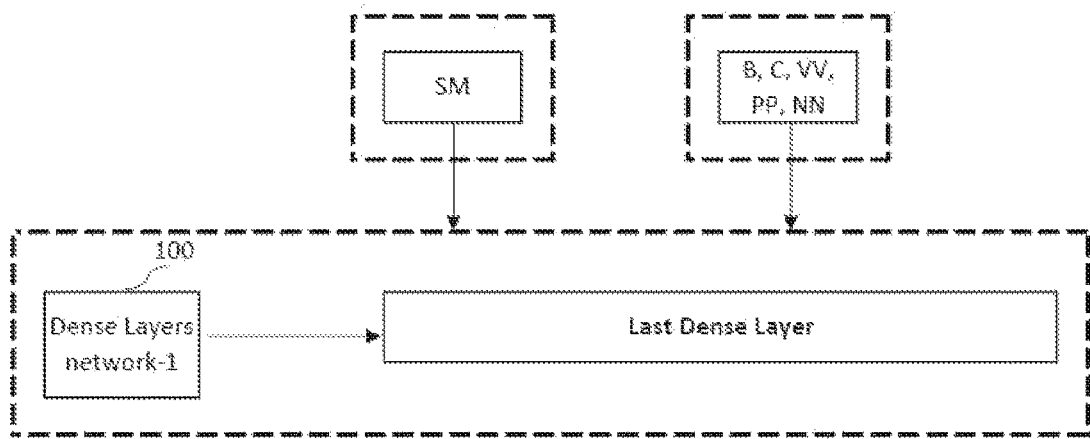
Figure 5D:
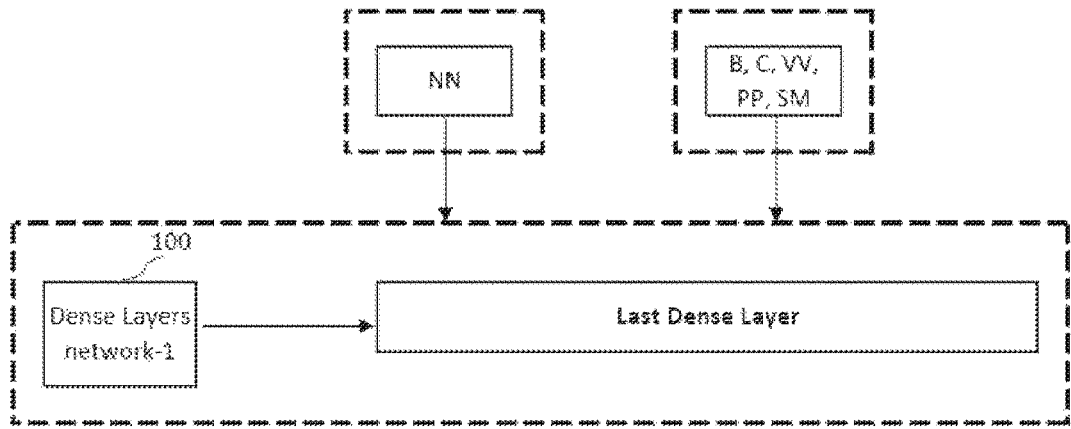
Figure 5E:
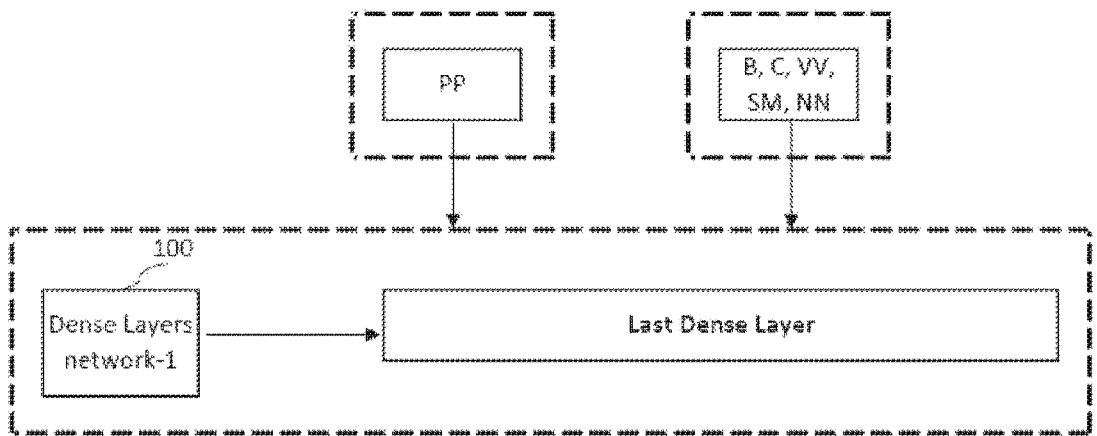
Figure 6A:
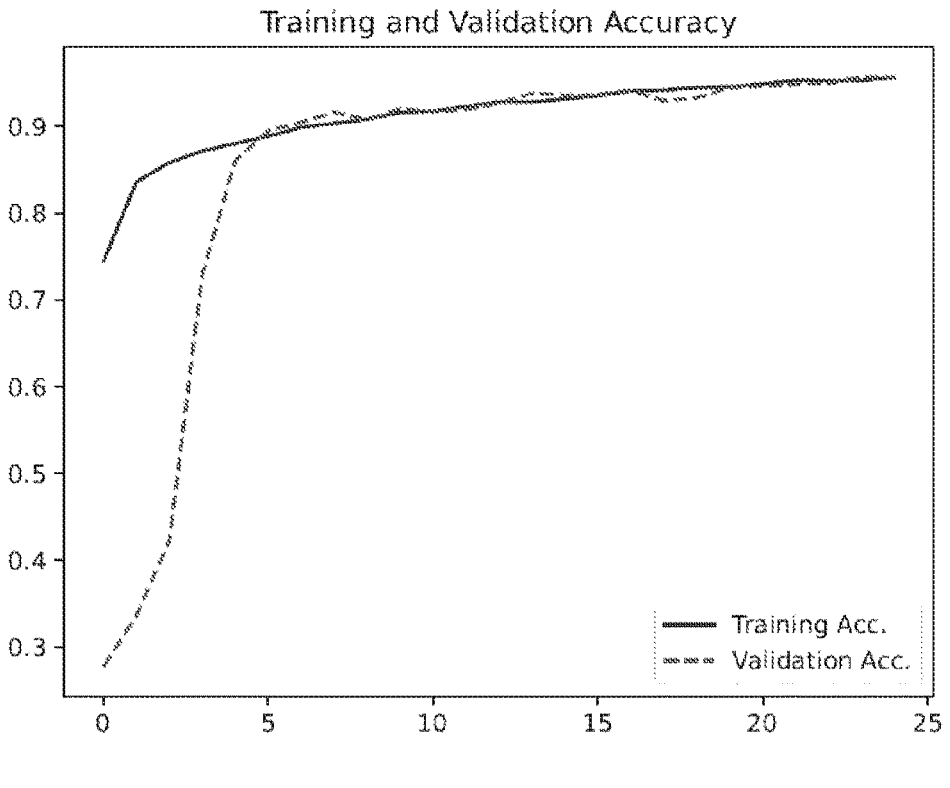
FIG. 6 illustrates a preferred embodiment of the present invention where the accuracy curves for the training on a small subset of images and labeled data are shown.
Figure 6B:
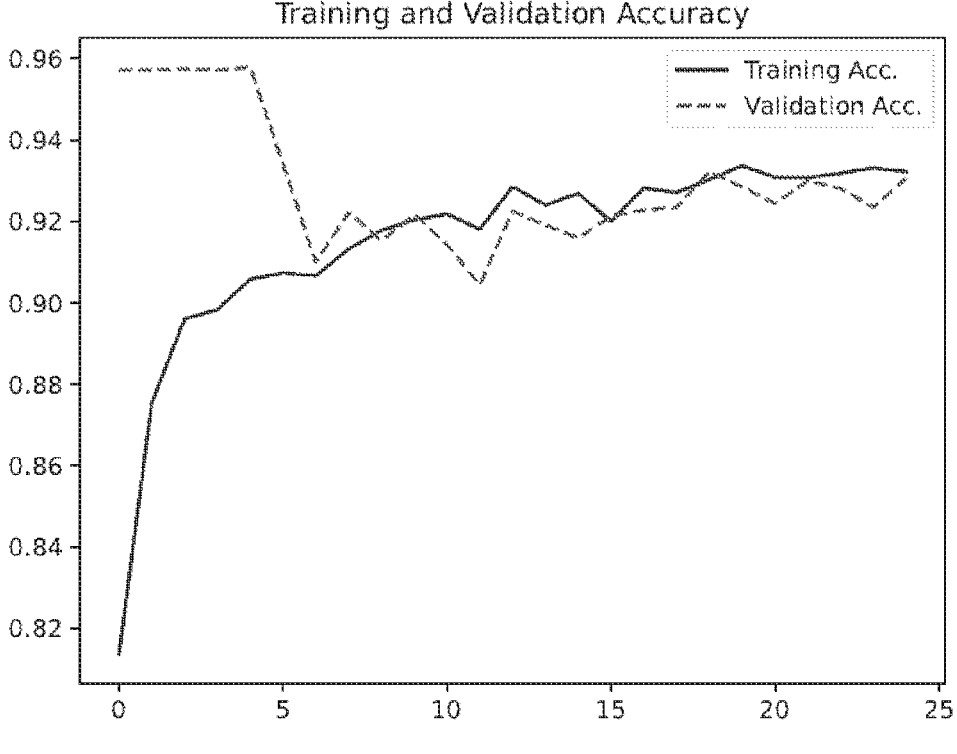
Figure 6C:
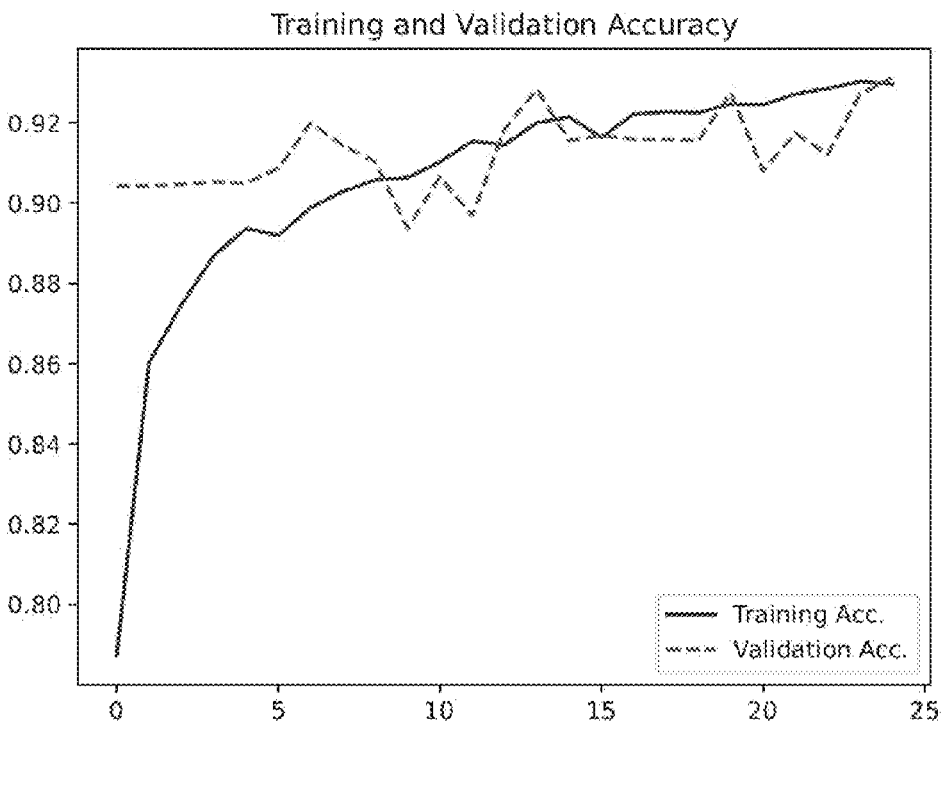
Figure 6D:
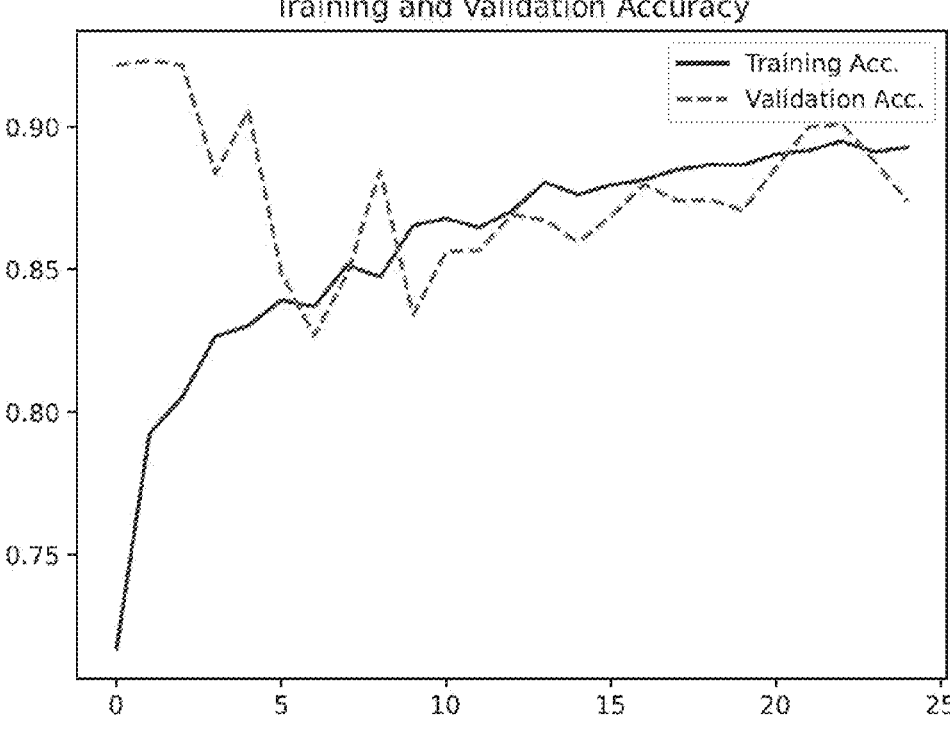
Figure 7A:
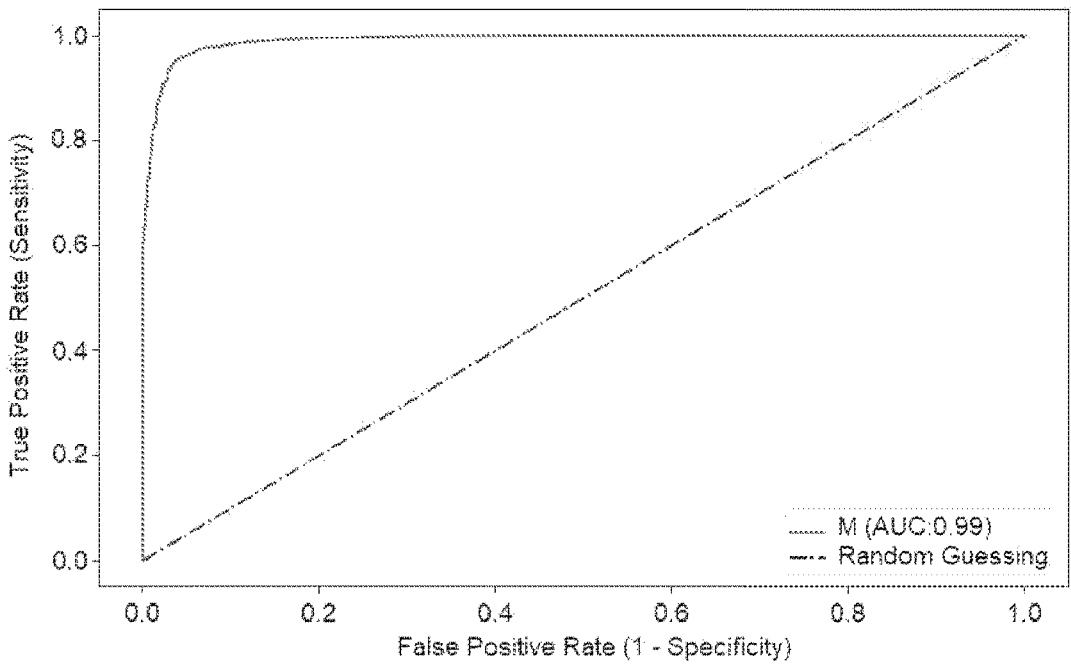
FIG. 7 illustrates exemplary ROC curves and AUC values obtained after training on a subset of images and labeled data according to an embodiment of the present invention.
Figure 7B:
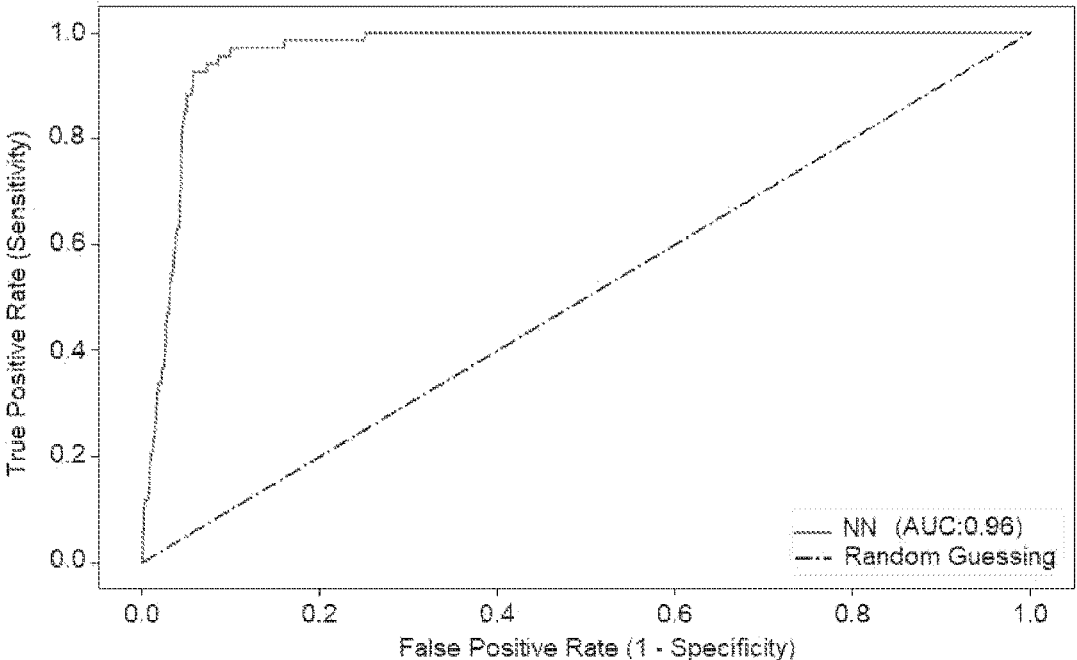
Figure 7C:
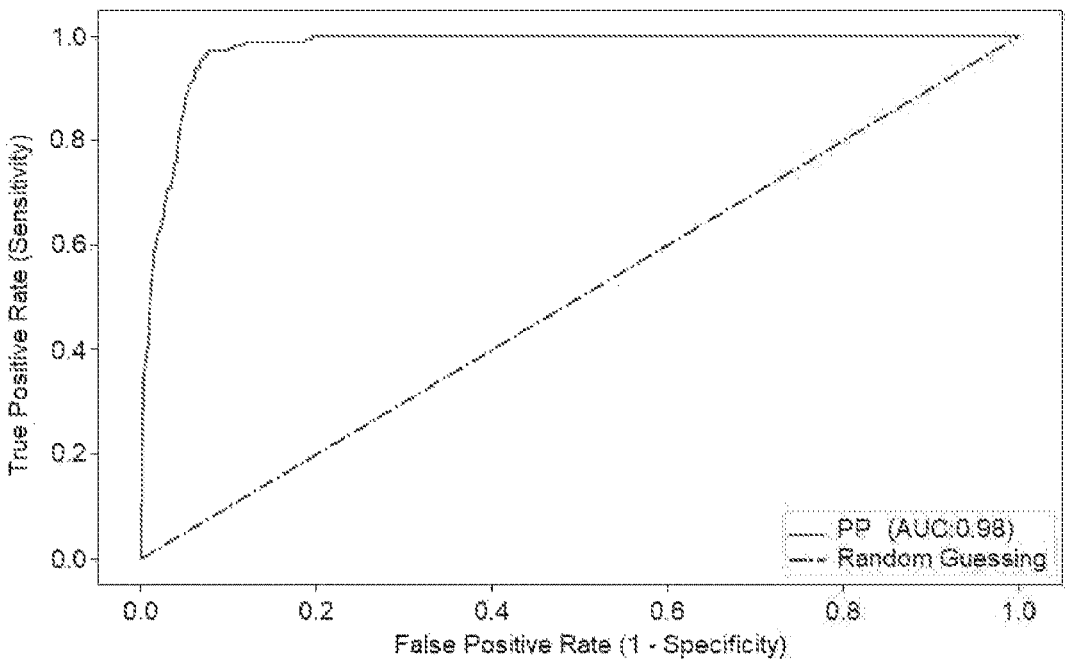
Figure 7D:
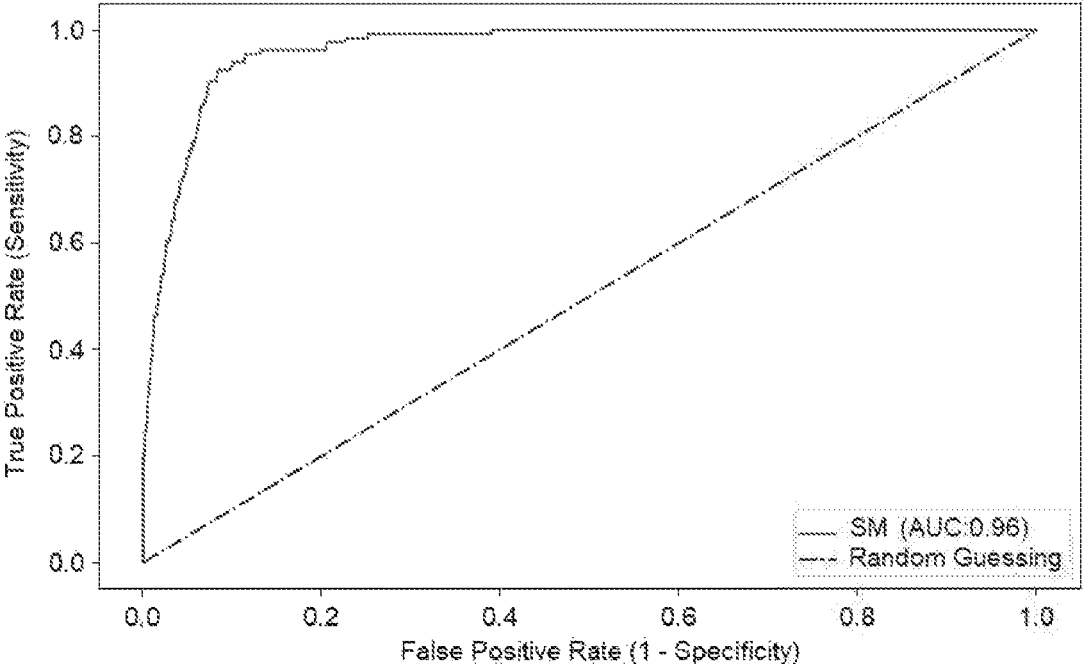
Figure 7E:
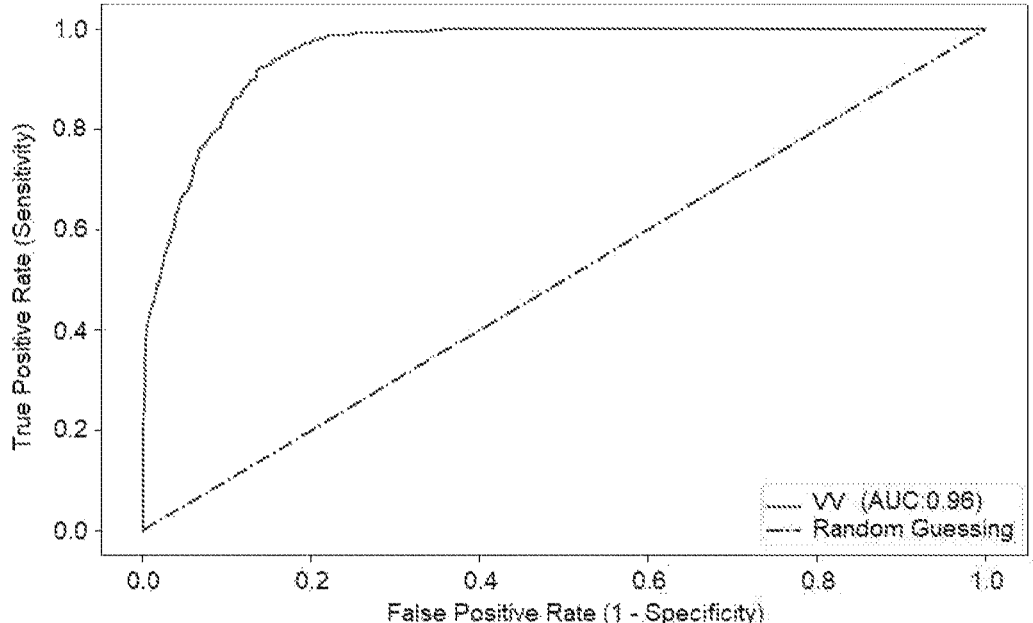
Figure 8A:
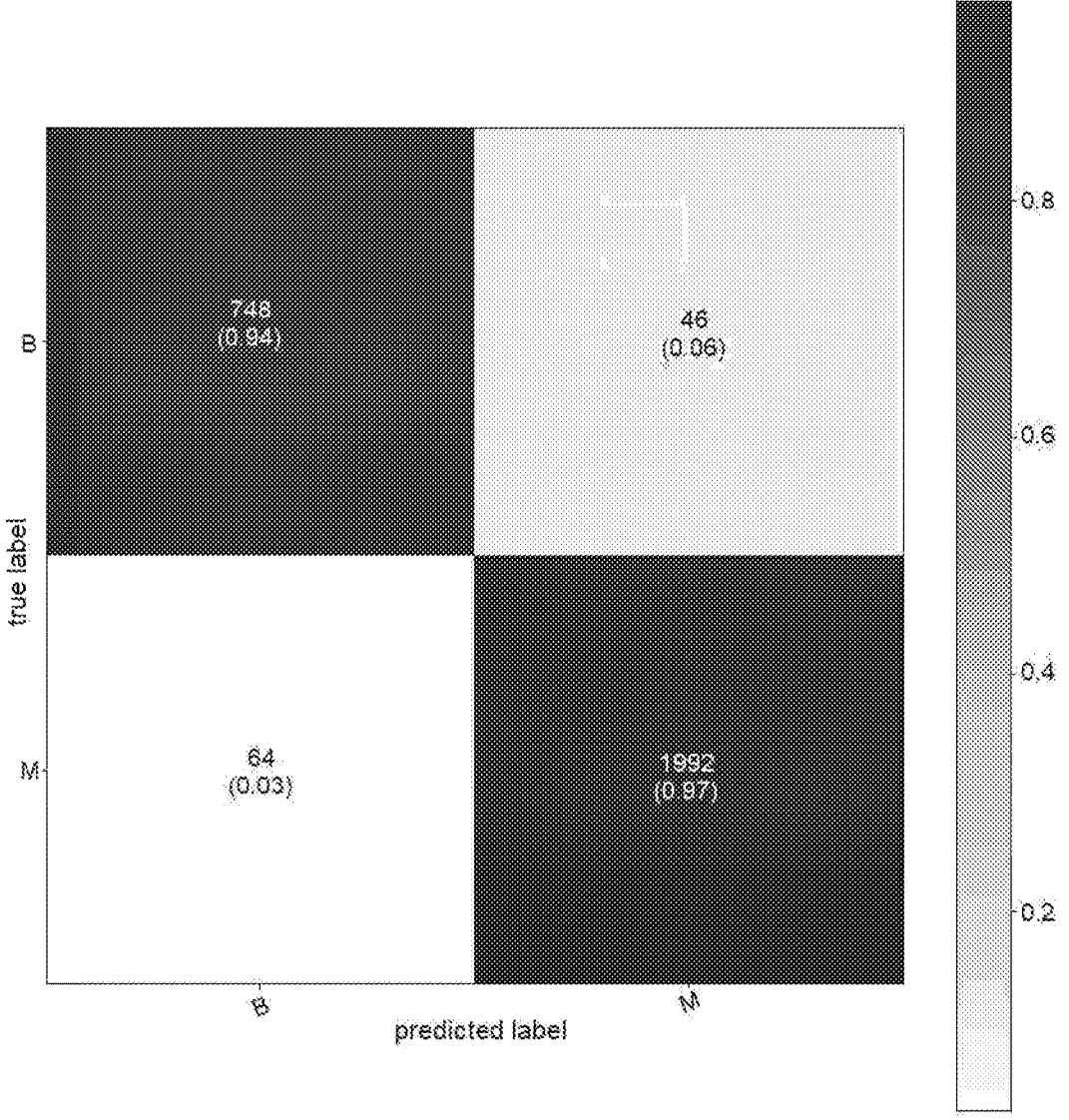
FIG. 8 illustrates an exemplary confusion matrix after training on a subset of images and labeled data, according to an embodiment of the present invention.
Figure 8B:
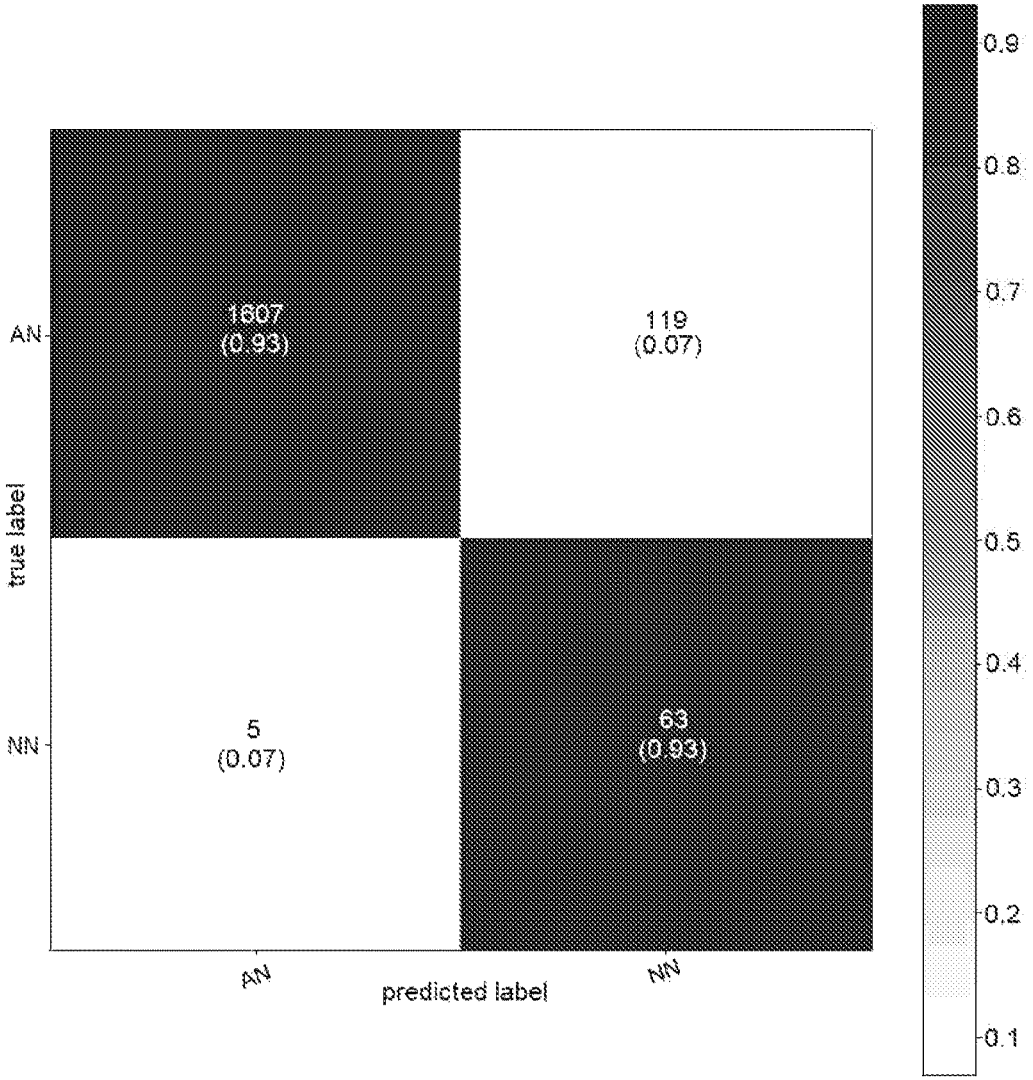
Figure 8C:
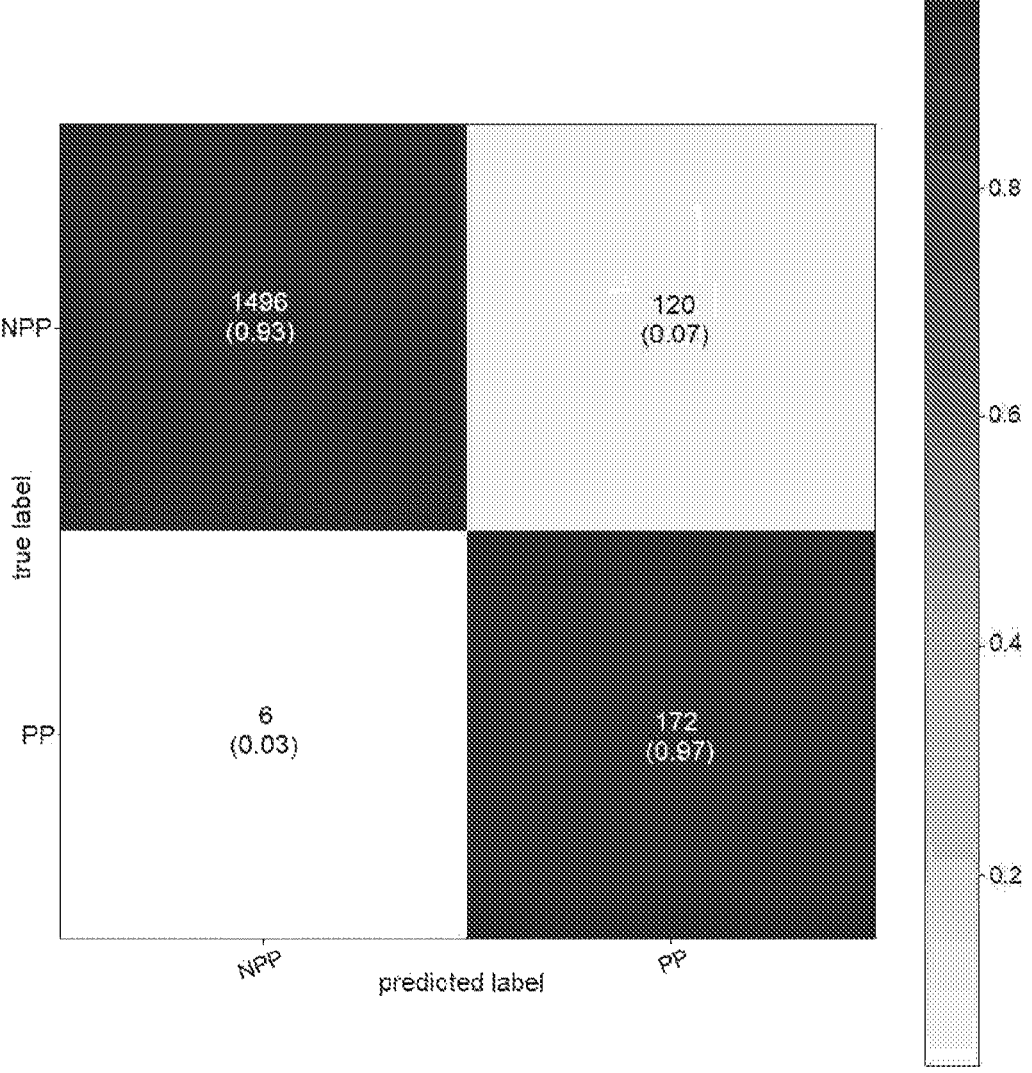
Figure 8D:
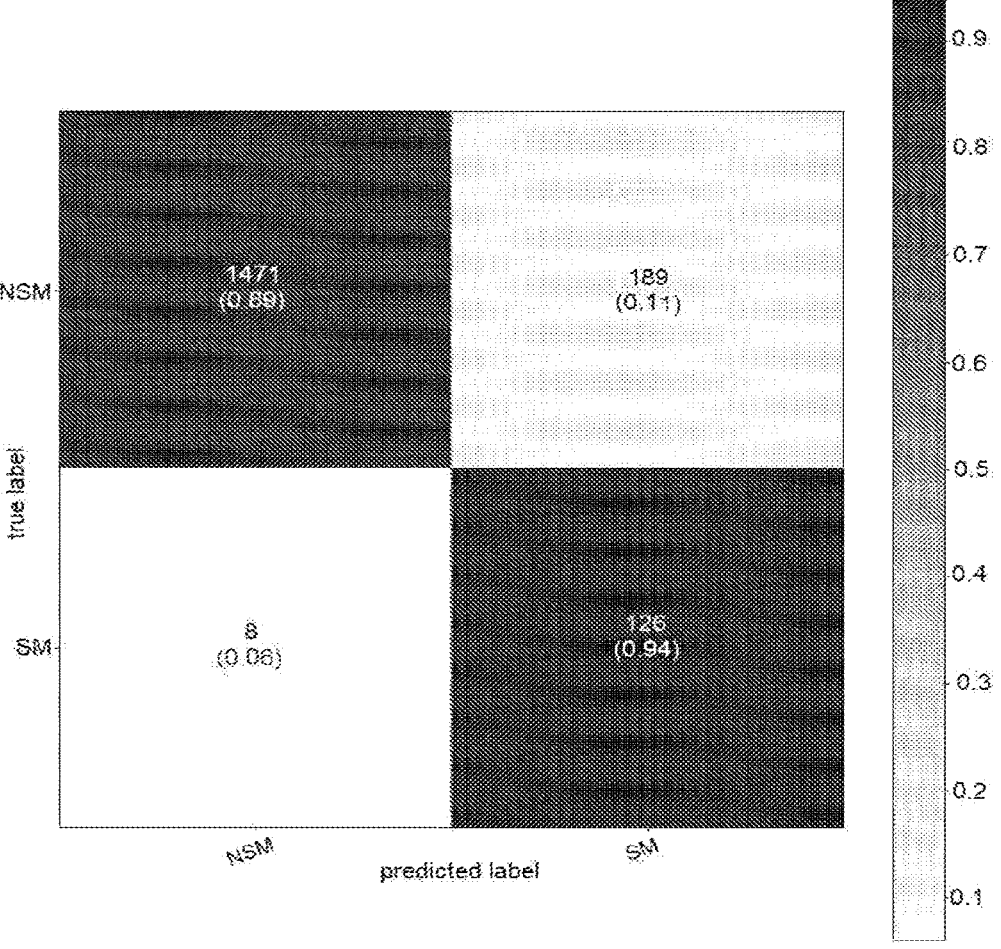
Figure 8E:
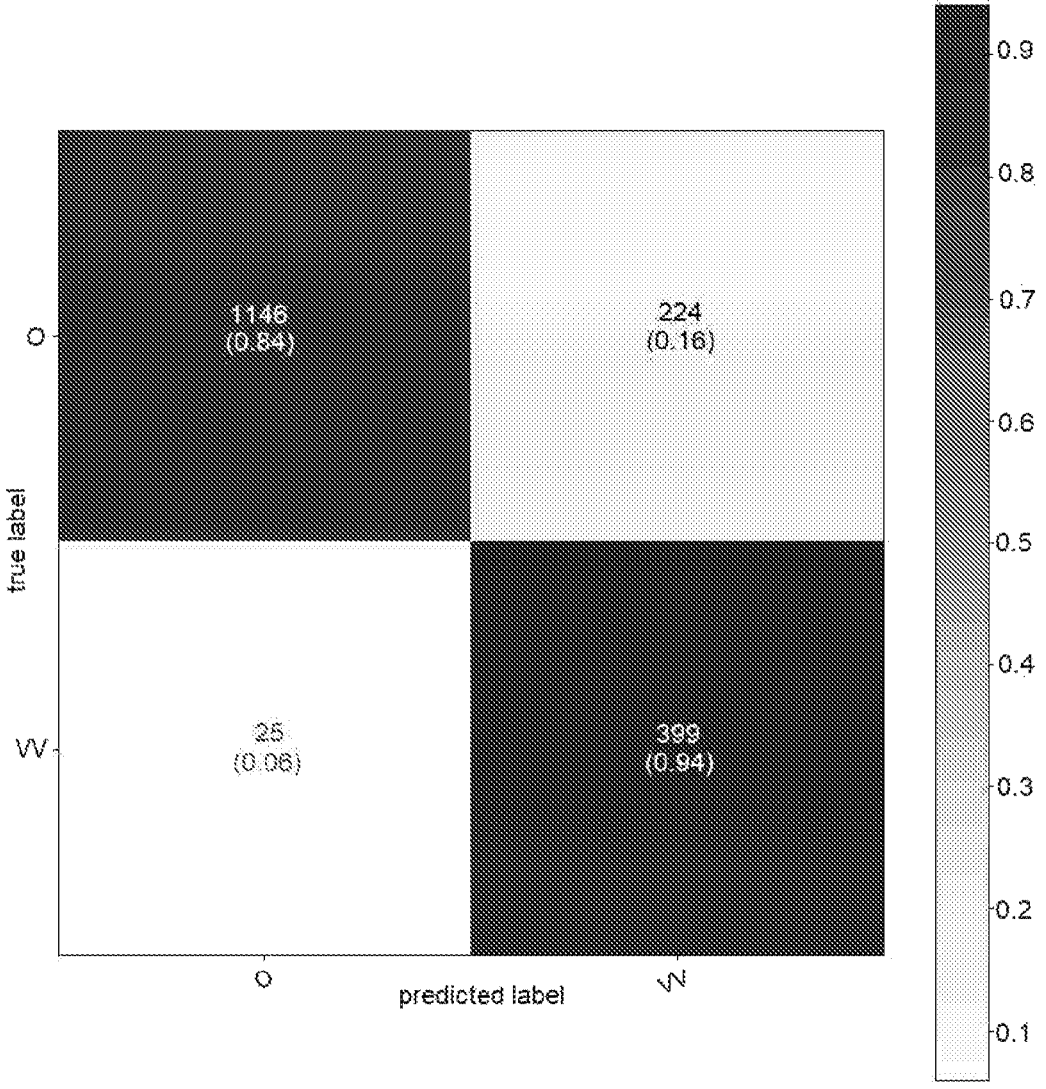
Figure 9A:
FIG. 9 illustrates examples of lesions classification, according to an embodiment of the present invention.
Figure 9B:
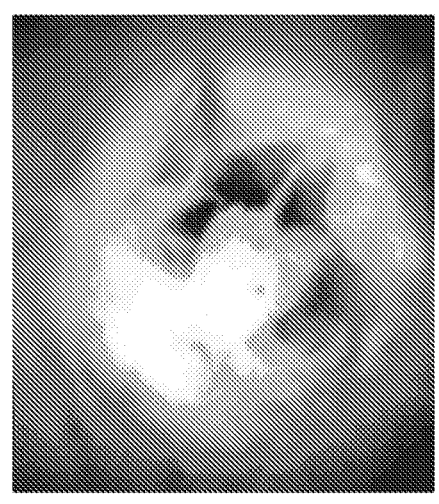
Figure 9C:
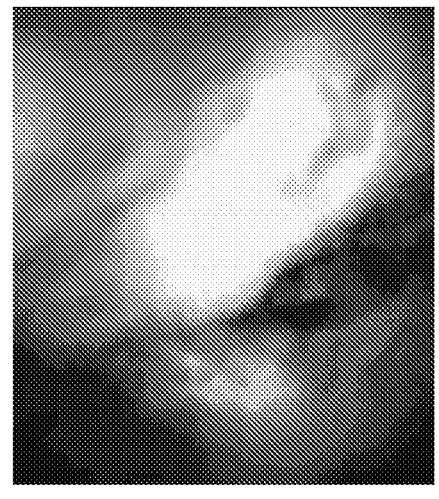
Figure 9D:
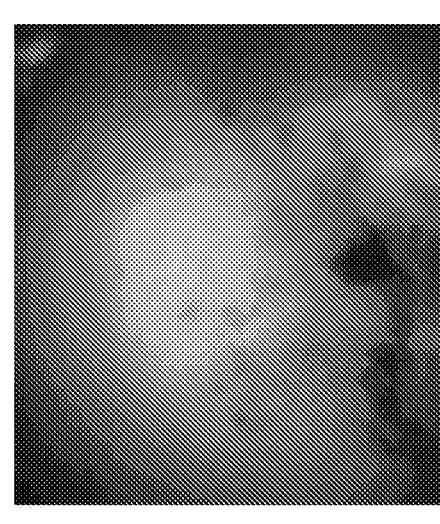
Figure 9E:

An embodiment of the classification network 100, as seen in FIG. 5, can classify as benign (B) or malignant (M), as detected in FIG. 5a. Other application embodiments allow to identify (VV) tumor vessels (FIG. 5b), (SM) tumor masses (FIG. 5c), (NN) tumor nodules (FIG. 5d), (PP) papillary projections (FIG. 5e) and (C) gallstones, are shown and grouped accordingly.

Figure 6E:
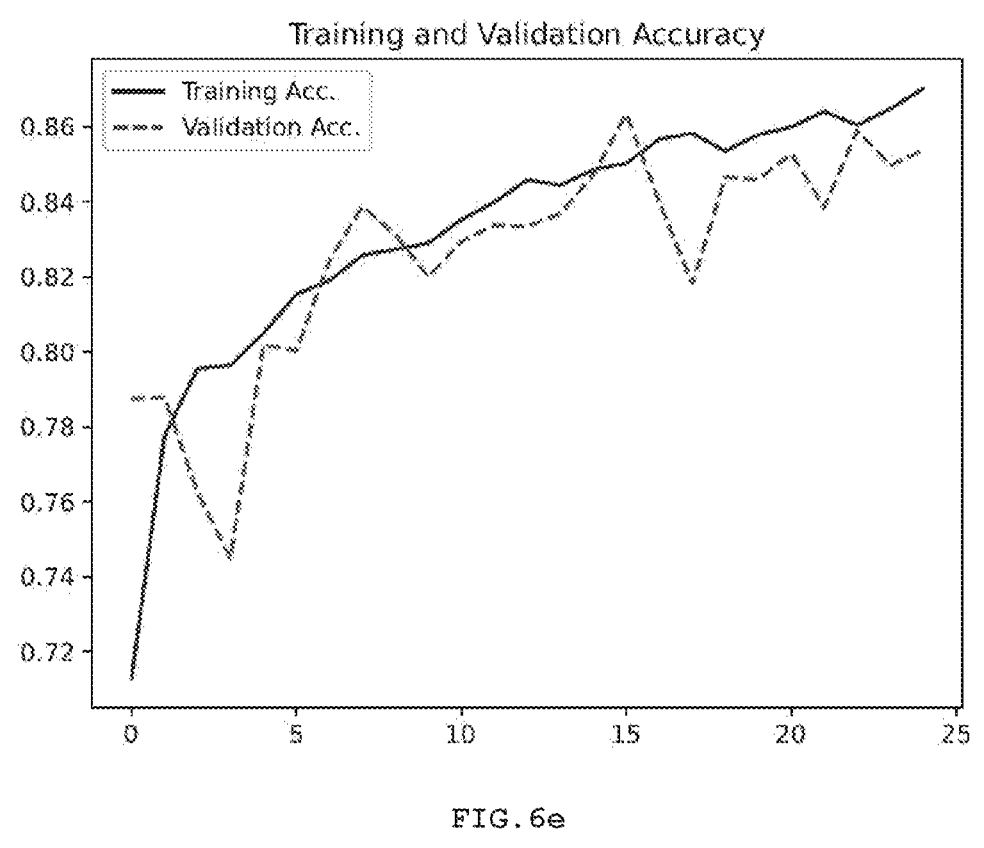

FIG. 6 illustrates a preferred embodiment of the present invention, in which the accuracy curves for the training, in a small subset of labelled images and data, are shown. The example of results of an iteration of method 8000 in exemplary embodiments of the present invention: (B) Benign, (M) Malignant (FIG. 6a); (VV) tumor vessels (FIG. 6b); (SM) tumor masses (FIG. 6c); (NN) tumor nodules (FIG. 6d); (PP) papillary projections (FIG. 6e); (C) gallstones.

At a given iteration of the method 8000 (FIGS. 7, 8, and 9), the optimization pipeline described herein uses accuracy curves, ROC curves and AUC values and the confusion matrix from training, on a small subset of images and labelled data.

We can detect on FIG. 7 exemplary ROC curves and AUC values obtained after the training on a small subset of images and labelled data, according to an embodiment of the present invention. The results are used for the model selection. Example of results from an iteration of method 8000 in exemplary embodiments of the present invention: (B) Benign, (M) Malignant (FIG. 7a); (VV) tumor vessels (FIG. 7b); (SM) tumor masses (FIG. 7c); (NN) tumor nodules (FIG. 7d); (PP) papillary projections (FIG. 7e); (C) gallstones;

We can detect on FIG. 8 an exemplary confusion matrix after training on a small subset of images and labelled data, according to an embodiment of the present invention. The results are used for the model selection. The number of images of the small subset of data and respective class proportion between parentheses, in exemplary embodiments of the present invention: (B) Benign, (M) Malignant (FIG. 8a); (VV) tumor vessels (FIG. 8b); (SM) tumor masses (FIG. 8c); (NN) tumor nodules (FIG. 8d); (PP) papillary projections (FIG. 8e); (C) gallstones;

We can observe an exemplary confusion matrix after training, on a small subset of images and labelled data, in FIG. 9, as well as the results used for the model selection. The number of images of the small subset of data and respective class proportion between parentheses. In this image, we find examples of lesions classification, in accordance with an embodiment of the present invention: (B) Benign (FIG. 9a); (PP) papillary projections (FIG. 9b); (SM) tumor masses (FIG. 9c); (M) Malignant (FIG. 9d); and (VV) Tumor Vessels (FIG. 9e);

FIG. 10 shows a result of performing lesions classification based on deep learning, on the data volume 240 and 250, according to an embodiment of the present invention. The results of the classification of benign (B) and malignant (M) in biliary ducts, using the training method 8000, of the present invention, are significantly improved as compared to the results using the existing methods (without the method 8000).

Figure 11:
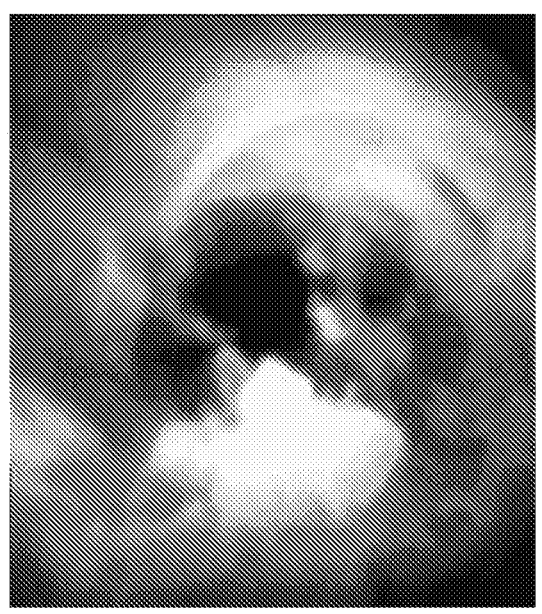
FIG. 11 illustrates an example of a classified lesion waiting for expert confirmation.

In FIG. 11 we find an example of a classified lesion waiting for validation by the output collector module 7000. By another neural network or any other computational system adapted to perform the validation task, the physician expert in Gastroenterology identifies biliary ducts lesions, analyzing the labelled image classified by the deep model 140. The options for image reclassification on the last layer of the classification network 100 are depicted in FIG. 5. Optionally, the confirmation or reclassification are sent to the storage module.

The foregoing Detailed Description is to be understood as being in every respect illustrative and exemplary, but not restrictive, and the scope of the invention disclosed herein should not be determined from the Detailed Description, but rather from the claims, as interpreted according to the full scope permitted by the patent laws. It is to be understood that the embodiments shown and described herein are only illustrative of the principles of the present invention and that various modifications may be implemented by those skilled in the art within the scope of the appended claims.

The invention claimed is:

1. A computer-implemented method for automatically identifying and classifying the biliary lesions of neoplastic or inflammatory etiology, in cholangioscopy medical images, by classifying pixel regions as biliary strictures and further detecting the relevant biliary morphologic features to characterize said strictures as malignant or benign, comprising:

selecting a number of subsets of all images, each of said subsets considering only images from a same patient;

selecting another subset as validation set, wherein the subset does not overlap chosen images on the previously selected subsets;

pre-training (8000) of each of the chosen subsets with one of a plurality of combinations of a convolution neural network image feature extraction component followed by a subsequent classification neural network component for pixel classification as biliary lesions of neoplastic or inflammatory etiology, wherein said pre-training:

early stops when scores do not improve over a given number of epochs, namely three;

evaluates the performance of each of the combinations;

is repeated on new, different subsets, with another networks combination and training hyperparameters, wherein such new combination considers a higher number of dense layers if f1-metrics are low and fewer dense layers if f1-metrics suggests overfitting;

selecting (400) the architecture combination that performs best during pre-training;

fully training and validating during training (9000) the selected architecture combination using the entire set of cholangioscopy medical images to obtain an optimized architecture combination;

prediction (6000) of the biliary lesions of neoplastic or inflammatory etiology using said optimized architecture combination for classification;

receiving the classification output (270) of the prediction (6000) by an output collector module with means of communication to a third-party capable of performing validation by interpreting the accuracy of the classification output and of correcting a wrong prediction, wherein the third-party comprises at least one of: another neural network, any other computational system adapted to perform the validation task or, optionally, a physician expert in biliary digital cholangioscopy imagery;

storing the corrected prediction into a storage component.

2. The method of claim 1, wherein the classification network architecture comprises at least two blocks, each having a Dense layer followed by a Dropout layer.

3. The method of claim 1, wherein the last block of the classification component includes a BatchNormalization layer, followed by a Dense layer where the depth size is equal to the number of lesions type one desires to classify.

4. The method of claim 1, wherein the set of pre-trained neural networks is the best performing among the following: VGG16, InceptionV3, Xception, EfficientNetB5, EfficientNetB7, Resnet50 and Resnet125.

5. The method of claim 1, wherein the best performing combination is chosen based on the overall accuracy and on the f1-metrics.

6. The method of claim 1, wherein the training of the best performing combination comprises two to four dense layers in sequence, starting with 4096 and decreasing in half up to 512.

7. The method of claim 1, wherein between the final two layers of the best performing combination there is a dropout layer of 0.1 drop rate.

8. The method of claim 1, wherein the training of the subset of images includes a ratio of training-to-validation of 10%-90%.

9. The method of claim 1, wherein the third-party validation is done by user-input.

10. The method of claim 1, wherein the training dataset includes images in the storage component that were predicted sequentially performing the steps of such method.

11. A portable endoscopic device comprising instructions which, when executed by a processor, cause the computer to carry out the steps of the method of claim 1.

* * * * *